United States Patent
Lee

(10) Patent No.: US 6,230,019 B1
(45) Date of Patent: May 8, 2001

(54) APPARATUS AND METHODS FOR DISPLAYING SHORT MESSAGE TRANSMISSION STATE INFORMATION IN MOBILE RADIO TERMINAL

(75) Inventor: Hye-Young Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/174,819

(22) Filed: Oct. 19, 1998

(30) Foreign Application Priority Data

Oct. 18, 1997 (KR) .................................................. 97-53652

(51) Int. Cl.⁷ ....................................................... H04Q 7/20
(52) U.S. Cl. ............................ 455/466; 455/566; 455/412
(58) Field of Search ................................... 455/466, 566, 455/551, 550, 412, 517, 414

(56) References Cited

U.S. PATENT DOCUMENTS

| | | | |
|---|---|---|---|
| 5,678,179 | * 10/1997 | Turcotte et al. | 455/466 |
| 5,692,032 | * 11/1997 | Seppanen et al. | 379/58 |
| 5,875,403 | * 3/1996 | Christal | 455/550 |
| 5,878,351 | * 11/1996 | Alanara et al. | 455/466 |
| 5,884,170 | * 9/1996 | Valentine et al. | 455/433 |
| 5,937,355 | * 8/1997 | Joong et al. | 455/466 |
| 6,014,561 | * 5/1996 | Molne | 455/419 |
| 6,026,291 | * 4/1997 | Carlsson et al. | 455/406 |
| 6,044,275 | * 3/1998 | Boltz et al. | 455/466 |
| 6,047,196 | * 9/1997 | Andersson | 455/466 |
| 6,055,662 | * 12/1998 | Lokman | 714/749 |

* cited by examiner

*Primary Examiner*—Edward F. Urban
*Assistant Examiner*—Tilahun Gesesse
(74) *Attorney, Agent, or Firm*—Dilworth & Barrese, LLP

(57) ABSTRACT

Apparatus and methods for displaying transmission state information of a transmitted short message in a mobile radio terminal are provided. The apparatus includes: a memory for storing the transmitted short message and a transmission option associated therewith; control means for receiving at least one of a first short message from a mobile exchange and a second short message from a short message service center, said control means analyzing the first short message to generate a first result corresponding to whether the transmitted short message has been successfully transmitted when the first short message is received, analyzing the second short message to generate a second result corresponding to whether the transmitted short message has been successfully transmitted when the second short message is received; and display means for displaying at least one of the first result and the second result generated by said control means.

24 Claims, 3 Drawing Sheets

APPARATUS AND METHODS FOR DISPLAYING SHORT MESSAGE TRANSMISSION STATE INFORMATION IN MOBILE RADIO TERMINAL

BACKGROUND OF THE INVENTION

1. Field of the Invention

The present invention relates to short message service systems for mobile radio terminals and, more particularly, to apparatus and methods for displaying the transmission state of a short message in a mobile radio terminal.

2. Description of the Related Art

In general, the function of a short message service (hereinafter referred to as "SMS") is to enable message communication between mobile radio terminals or between a wired telephone and a mobile radio terminal. In the latter case, short messages from a fixed communication network (e.g., public switched telephone network (PSTN) or an integrated services digital network (ISDN)) are stored in a processing unit of a mobile communication network, converted to digital data, and transmitted to the mobile radio terminal.

Conventionally, after transmitting a short message, a mobile radio terminal such as a global system for mobile (GSM) communication only stores the short message. As a result, a user cannot recognize the transmission state (e.g., successful or failed transmission) of the short message. This is inconvenient to the user. Accordingly, it would be desirable and highly advantageous to provide apparatus and methods for displaying the transmission state of a short message in a mobile radio terminal.

SUMMARY OF THE INVENTION

It is an object of the present invention to provide apparatus and methods for storing short message transmission state information together with a short message which has been transmitted, and displaying the transmission state information to apprise a user of the same.

In accordance with one aspect of the present invention, an apparatus for displaying transmission state information of a transmitted short message in a mobile radio terminal comprises: a memory for storing the transmitted short message and a transmission option associated therewith; control means for receiving at least one of a first short message from a mobile exchange and a second short message from a short message service center, said control means analyzing the first short message to generate a first result corresponding to whether the transmitted short message has been successfully transmitted when the first short message is received, analyzing the second short message to generate a second result corresponding to whether the transmitted short message has been successfully transmitted when the second short message is received; and display means for displaying at least one of the first result and the second result generated by said control means.

In accordance with another aspect of the present invention, a method for displaying short message transmission state information in a mobile radio terminal comprises the steps of: generating a desired short message and transmitting the desired short message together with a transmission option corresponding thereto; storing the desired short message and displaying information on a display unit indicating whether the desired short message was successfully transmitted, based on information included in a reception acknowledge message received from a mobile exchange; and displaying a processed result of the transmission option, when a transmission option short message including the processed result of the transmission option is received from a short message service center.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

In the following description, numerous specific details are set forth by way of example so as to provide a more thorough understanding of the present invention. However, it will be apparent to one skilled in the art of the invention that the invention may be practiced without these specific details. Furthermore, the detailed description of known functions and construction details unnecessarily obscuring the subject matter of the present invention will not be provided in the following description.

Figure 1:
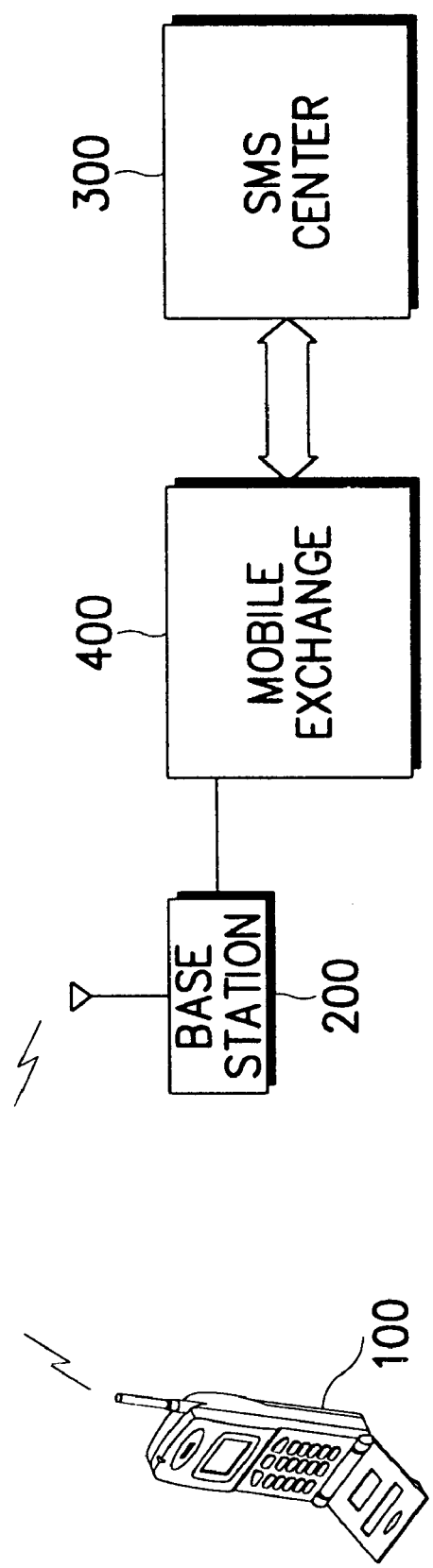
FIG. 1 is a schematic diagram of a mobile radio terminal short message service (SMS) system to which the present invention is applied.

FIG. 1 is a schematic diagram of a mobile radio terminal short message service (SMS) system to which the present invention is applied. Referring to FIG. 1, it is assumed that a mobile radio terminal 100 transmits a short message. The short message is sent to a mobile exchange 400 via a base station 200. The mobile exchange 400 informs mobile terminal 100 that it has received the short message, and then transfers the received short message to the other terminal called by mobile terminal 100. An SMS service center 300 is connected to mobile exchange 400, as well as to other mobile exchanges (not shown) and a public switched telephone network (PSTN) or an integrated services digital network (ISDN) (not shown), so as to exchange (receive and transmit) and store messages therebetween. The messages are stored in digital form.

Figure 2A:
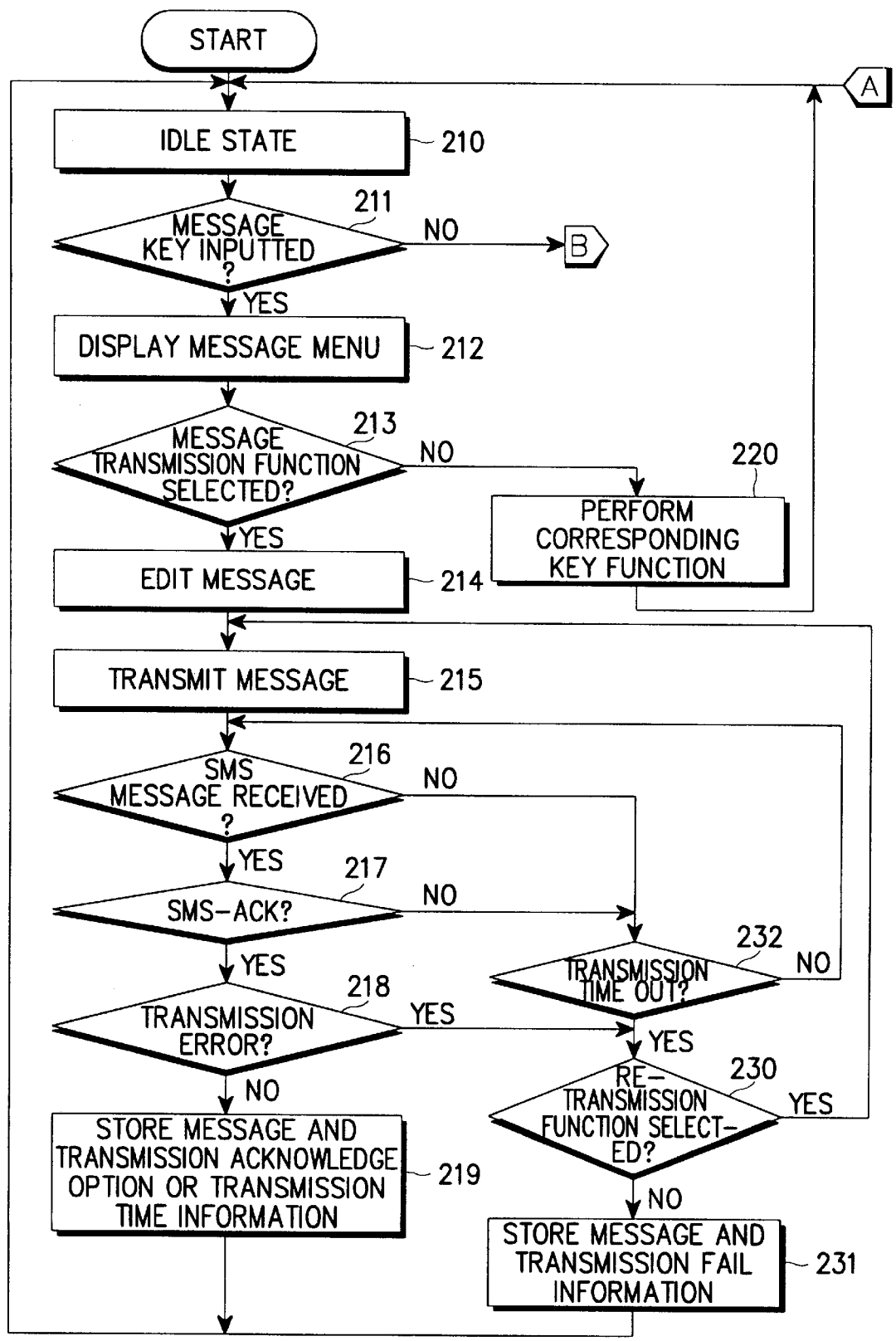
FIGS. 2a and 2b are flowcharts illustrating a method according to an embodiment of the invention for displaying the transmission state of a short message in the mobile radio terminal of FIG. 1.
Figure 2B:
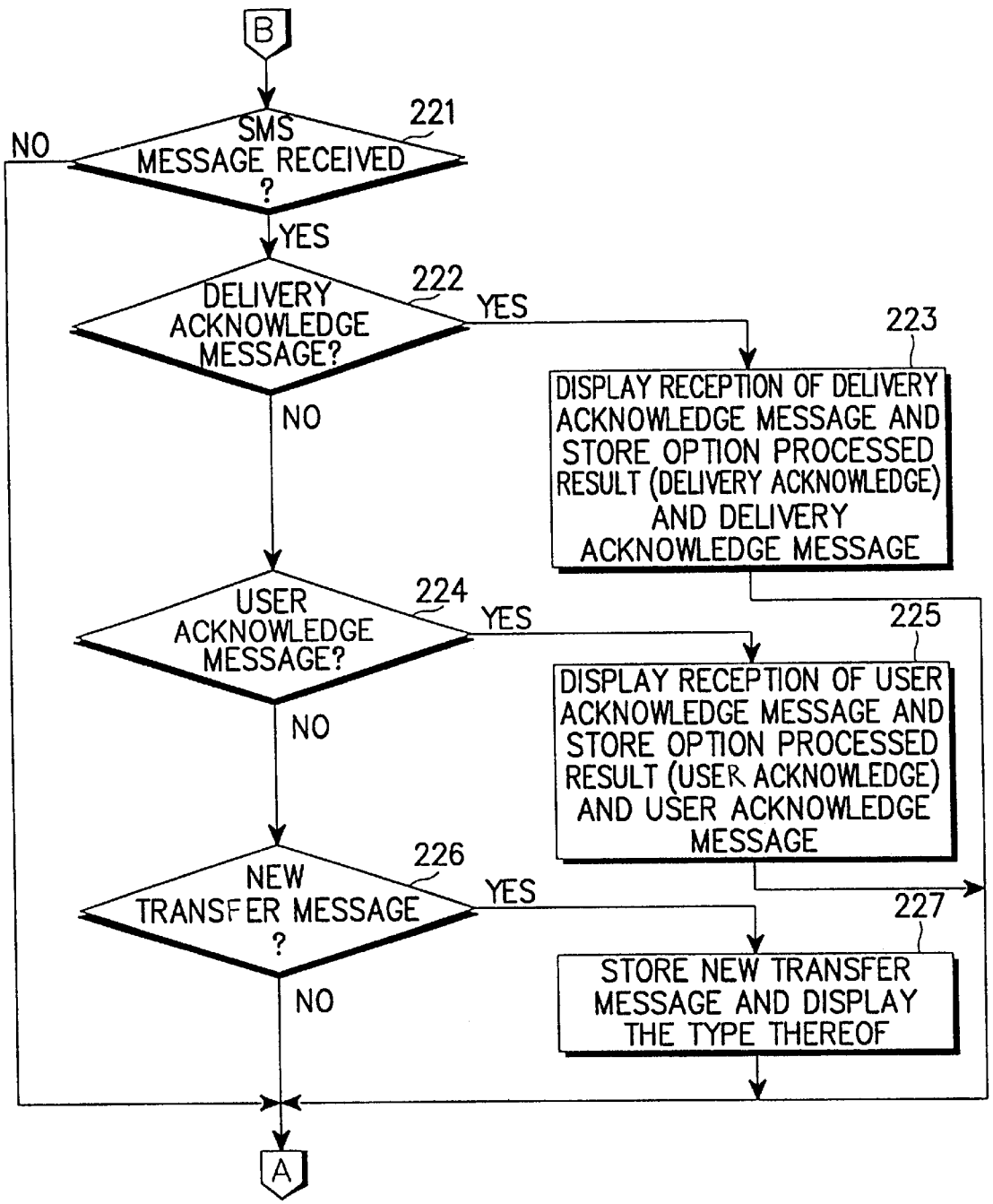

FIGS. 2a and 2b are flowcharts illustrating a method according to an embodiment of the invention for displaying the transmission state of a short message in the mobile radio terminal (100) of FIG. 1. Referring to FIG. 2a, a controller of mobile terminal 100 (hereinafter referred to as "terminal controller"), which was in an idle state at step 210, determines whether or not a message key signal has been inputted at step 211. If the message key signal has been inputted, then the terminal controller displays a message menu in a character form on a display unit (step 212). The message menu includes several selectable functions such as, for example, transmission and reception. Further, the transmission function may include several selectable functions such as, for example, cellular paging transceive and cellular message transceive.

Next, the terminal controller determines whether or not a message transmission function displayed in the message menu has been selected by the user (step 213). If the message transmission function has not been selected by the user, the terminal controller proceeds to step 220 to perform a corresponding key function and then, returns to step 210.

However, if the message transmission function has been selected by the user, then the terminal controller performs a message edit (i.e., compose) function (step 214). The message edit function includes inputting information such as a destination address, call back number, user data and other desired message field data through a user interface means (for example, keys on a front panel) in order to produce a short message based on the inputted information. The actual contents of the short message may be generated by selectively using various sentences provided by the mobile terminal, as well as consonants and vowels, and an alphabet. The provided sentences are of various types, which have been previously generated and stored. Using the consonants and vowels or the alphabet, sentences other than those already provided can be freely made in accordance with a user's intention.

At step 215, mobile terminal 100 transmits the edited message to mobile exchange 400 via base station 200. Upon receiving the edited message from mobile terminal 100, mobile exchange 400 transmits an acknowledge message to mobile terminal 100 which is also in the form of an SMS message.

Next, the terminal controller determines whether or not an SMS message has been received (step 216). If the SMS message has been received, then the terminal controller analyzes the received SMS message to determine whether or not it is an acknowledge message SMS-ACK (step 217). If the received SMS message is an acknowledge message SMS-ACK, then the terminal controller examines a specific field of the acknowledge message SMS-ACK to determine whether or not a transmission error has occurred with respect to the SMS message transmitted from mobile terminal 100 to mobile exchange 400 (step 218). For example, if the specific field is "1", then a transmission error has occurred. On the other hand, if the specific field is "0", then the transmission of the SMS message has been normally performed (i.e., without error).

If it is determined at step 218 that the transmission of the SMS message (from mobile terminal 100 to mobile exchange 400) was performed without error, then the terminal controller stores transmission acknowledge option information (explained further hereinbelow) or time information indicative of a successful (i.e., normal) transmission together with the edited and transmitted short message (step 219). However, if it is determined that the transmission of the SMS message was performed with error, then the terminal controller proceeds to step 230 to determine whether or not a re-transmission function has been selected.

If the re-transmission function has been selected, then the terminal controller returns to step 215 to repeat the message transmission. However, if the re-transmission function has not been selected, then the terminal controller proceeds to step 231 to store information indicative of a failed transmission together with the edited short message.

The re-transmission function may be selected by sensing a corresponding key input in real time. Alternatively, the re-transmission function may be previously selected. In the latter case, the associated information is stored in a memory so that the information may later be simply ascertained.

In the case that an SMS message has not been received at step 216 or the received SMS message is not an acknowledge message SMS-ACK at step 217, then the terminal controller proceeds to step 232 to determine whether or not the message transmission is timed out. If the message transmission is not timed out, then the terminal controller returns to step 216. However, if the message transmission is timed out, then the terminal controller proceeds to step 230. After performing steps 219 and 231, the terminal controller returns to the idle state at step 210.

In other embodiments, the terminal controller displays the results of transmission as indicated in the SMS-ACK. In other words, "transmission successful" is displayed at step 219, or "transmission failure" is displayed at step 231.

A failed transmission can be determined according to whether a general acknowledge message, a delivery acknowledge message or a user acknowledge message has been received. The delivery acknowledge message and user acknowledge message are enabled by setting options in a short message upon transmitting it. The respective options are referred to as a delivery acknowledge option and a user acknowledge option.

Upon receiving a short message in which the delivery acknowledge option is set, the SMS center initially transmits a message to the transmitting terminal indicating that the SMS center has received the short message. Then, the SMS center transmits the received short message to the receiving terminal when the receiving terminal is ready for reception. Subsequently, the SMS center transmits a delivery acknowledge message to the transmitting terminal via the mobile exchange indicating that the short message has been transmitted to the receiving terminal. On the other hand, upon receiving a short message in which the user acknowledge option is set, the receiving terminal transfers a user acknowledge message generated by the user to the SMS center, which then transfers the user acknowledge message to the transmitting terminal via the mobile exchange.

Referring to FIGS. 2a and 2b, in the case that it is determined at step 211 that a message key signal has not been inputted, then it is determined whether or not an SMS message has been received (step 221). If an SMS message has been received, then the terminal controller determines whether or not the received SMS message is a delivery acknowledge message (step 222). If the received SMS message is a delivery acknowledge message, then the terminal controller proceeds to step 223 to display the delivery acknowledge message on the display unit so as to inform the user of the receipt of such message. Also at step 223, the terminal controller extracts an address of the receiving terminal from the received SMS message (delivery acknowledge message) and detects, among short messages previously stored in a memory which have already been transmitted, a short message having the same destination address as that of the receiving terminal. Further, the terminal controller records a delivery acknowledge state in a transmission state recording region of the detected short message and stores the delivery acknowledge message together with the detected short message at step 223.

In the case that the received SMS message is not the delivery acknowledge message at step 222, then the terminal controller determines whether or not the received SMS message is a user acknowledge message (step 224). If the received SMS message is a user acknowledge message, then the terminal controller proceeds to step 225 to display the user acknowledge message on the display unit so as to inform the user of the receipt of such message. Also at step 225, the terminal controller extracts an address of the receiving terminal from the received SMS message (user acknowledge message) and detects, among short messages previously stored in a memory which have already been transmitted, a short message having the same destination address as that of the receiving terminal. Further, the terminal controller records a user acknowledge state in a transmission state recording region of the detected short message and stores the user acknowledge message together with the detected short message at step 225.

In the case that the received SMS message is not a user acknowledge message at step 224, then the terminal controller determines whether or not the received SMS message is a new transfer message (step 226). If the received SMS message is a new transfer message, then the terminal controller proceeds to step 227 to store the new transfer message. Also at step 227, the terminal controller displays the type (e.g., voice, character letter or radio paging) of the new transfer message on the display unit so as to inform the user of the type of the new transfer message. After performing steps 223, 225 and 227, the terminal controller returns to the idle state at step 210.

Thus, according to the present invention, after transmitting a short message, a mobile radio terminal displays transmission state information such as, for example, information indicative of a transmission failure, a successful transmission, or a user acknowledgment. In this way, the user may readily identify the state of a message transmission.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for displaying acknowledgment status messages in a mobile radio terminal, said acknowledgment status messages being based on acknowledgment messages generated by a telecommunication system in response to a short message service (SMS) message said SMS message being previously transmitted by the mobile radio terminal, said telecommunication system having a mobile exchange and a SMS center, comprising:
    a memory for storing the previously transmitted SMS message and an associated transmission option;
    control means for receiving at least one of a first acknowledgment message from the mobile exchange and a second acknowledgment message from the SMS center, said first acknowledgment message acknowledging receipt of the previously transmitted SMS message at the mobile exchange, for generating a first acknowledgment status display message in response to a received first acknowledgment message, and for generating a second acknowledgment status display message in response to a received second acknowledgment message; and
    display means for displaying at least one of the first acknowledgment status display message and the second acknowledgment status display message.

2. The apparatus of claim 1, wherein the second acknowledgment message corresponds to the transmission option associated with the previously transmitted SMS message.

3. The apparatus of claim 1, wherein the second acknowledgment message is a delivery acknowledge message which is generated by the SMS center upon receiving the previously transmitted SMS message from the mobile radio terminal via the mobile exchange.

4. The apparatus of claim 3, wherein said control means is adapted to extract an address of a receiving terminal from the delivery acknowledge message, to detect a SMS message having a destination address that is identical to the extracted address, and to record a delivery acknowledge state in a transmission state recording region of the detected SMS message.

5. The apparatus of claim 4, wherein the detected SMS message is detected from among previously transmitted SMS messages stored in the memory.

6. The apparatus of claim 1, wherein the second acknowledgment message is a user acknowledge message generated by a receiving terminal upon receiving the previously transmitted SMS message from the mobile radio terminal via the mobile exchange and SMS center.

7. The apparatus of claim 6, wherein said control means is adapted to extract an address of a receiving terminal from the user acknowledge message, to detect a SMS message having a destination address that is identical to the extracted address, and to record a user acknowledge state in a transmission state recording region of the detected SMS message.

8. The apparatus of claim 7, wherein the detected SMS message is detected from among previously transmitted SMS messages stored in the memory.

9. The apparatus of claim 1, wherein said memory further comprises a region for storing the second acknowledgment message.

10. The apparatus of claim 1, wherein said memory further comprises a region for storing a newly received SMS message and information corresponding to a type of the newly received SMS message.

11. The apparatus of claim 1, wherein the first acknowledgment message is an SMS-ACK message, said SMS-ACK message having a specific field for indicating whether a transmission error has occurred.

12. The apparatus of claim 1, wherein the first and second acknowledgment messages are in the format of SMS messages.

13. The apparatus of claim 1, wherein the associated transmission option of the previously transmitted SMS message is indicated by fields within the previously transmitted SMS message.

14. A method for displaying short message service (SMS) message transmission status information in a mobile radio terminal, comprising the steps of:
    (a) transmitting a SMS message together with a transmission option corresponding thereto;
    (b) storing the transmitted SMS message;
    (c) determining whether a reception acknowledgement message is received, said reception acknowledgment message indicating that a SMS message has been received at a mobile exchange;
    (d) displaying information on a display unit indicating whether the transmitted SMS message was successfully received by a mobile exchange, if a reception acknowledgment message is received from a mobile exchange;
    (e) determining whether a transmission option acknowledgment message is received; and
    (f) displaying a result of the transmission option, if a transmission option acknowledgment message including the result of the transmission option is received from a SMS center.

15. The method of claim 14, further comprising the steps of:
    (g) extracting an address of a receiving terminal from the transmission option acknowledgment message;
    (h) detecting a SMS message with a destination address that is identical to the extracted address; and
    (i) recording the result of the transmission option in a transmission state recording region of the detected SMS message.

16. The method of claim 15, wherein the detected SMS message is detected from among SMS messages previously transmitted and stored in the memory.

17. The method of claim 15, further comprising the step of:
- (j) storing the transmission option acknowledgment message.

18. The method of claim 14, wherein, after determining that a reception acknowledgment message is received, the method further comprises the steps of:
- examining a specific field of the reception acknowledgment message to determine whether or not a transmission error has occurred with respect to the transmitted SMS message; and
- storing, if it is determined there was no transmission error, the reception acknowledgment message together with the stored transmitted SMS message.

19. The method of claim 18, wherein, if it is determined there was a transmission error, the method further comprises the steps of:
- determining a retransmission function has been selected; and
- repeating, if the retransmission function has been selected, step (a) with the stored transmitted SMS message.

20. The method of claim 14, further comprising the steps of:
- starting, when the SMS message is transmitted in step (a), a message transmission timer;
- determining whether the message transmission timer has counted a predetermined time;
- determining, if the message transmission timer has counted to the predetermined time, whether a retransmission function has been selected; and
- repeating, if the retransmission function has been selected, step (a) with the stored transmitted SMS message.

21. The method of claim 20, wherein, if it is determined the retransmission function has not been selected, the method further comprises the steps of:
- storing information indicative of a failed transmission together with the stored transmitted SMS message.

22. A method for displaying short message service (SMS) message transmission status information in a mobile radio terminal, comprising the steps of:
- (a) transmitting a SMS message together with a transmission option corresponding thereto;
- (b) receiving at least one of a first acknowledgment message from a mobile exchange and a second acknowledgment message from a SMS center;
- (c) analyzing the first acknowledgment message in order to generate a first result corresponding to whether the transmitted SMS message has been received, when a first acknowledgment message is received;
- (d) analyzing the second acknowledgment message in order to generate a second result corresponding to whether the transmitted SMS message has been received, when a second acknowledgment message is received; and
- (e) displaying at least one of the first result and the second result.

23. The method of claim 22, wherein the analyzing step (c) comprises the steps of:
- examining a specific field of the first acknowledgment message to determine whether or not a transmission error has occurred with respect to the transmitted SMS message;
- storing, if it is determined there was no transmission error, the first acknowledgment message together with the stored transmitted SMS message;
- determining, if it is determined there was a transmission error, if a retransmission function has been selected; and
- repeating, if the retransmission function has been selected, step (a) with the stored transmitted SMS message.

24. The method of claim 22, further comprising the steps of:
- starting, when the SMS message is transmitted in step (a), a message transmission timer;
- determining whether the message transmission timer has counted a predetermined time;
- determining, if the message transmission timer has counted to the predetermined time, whether a retransmission function has been selected;
- repeating, if it is determined the retransmission function has been selected, step (a) with the stored transmitted SMS message; and
- storing, if it is determined the retransmission function has not been selected, information indicative of a failed transmission together with the stored transmitted SMS message.

* * * * *